United States Patent
Tsaur

(10) Patent No.: US 8,825,972 B1
(45) Date of Patent: Sep. 2, 2014

(54) METHOD AND SYSTEM OF PRODUCING A FULL BACKUP IMAGE USING AN INCREMENTAL BACKUP METHOD

(75) Inventor: Ynn-Pyng "Anker" Tsaur, Oviedo, FL (US)

(73) Assignee: Symantec Corporation, Mountain View, CA (US)

(*) Notice: Subject to any disclaimer, the term of this patent is extended or adjusted under 35 U.S.C. 154(b) by 847 days.

(21) Appl. No.: 12/950,659

(22) Filed: Nov. 19, 2010

(51) Int. Cl.
*G06F 12/00* (2006.01)
*G06F 13/00* (2006.01)
*G06F 13/28* (2006.01)

(52) U.S. Cl.
USPC .......... 711/162; 707/646; 707/664; 707/674; 707/687

(58) Field of Classification Search
USPC ................ 707/664, 687, 646, 674; 711/162
See application file for complete search history.

(56) References Cited

U.S. PATENT DOCUMENTS

| | | | |
|---|---|---|---|
| 6,085,298 A | 7/2000 | Ohran | |
| 6,101,585 A | 8/2000 | Brown et al. | |
| 6,249,792 B1 | 6/2001 | Zwilling et al. | |
| 6,460,054 B1 | 10/2002 | Grummon | |
| 6,665,815 B1 | 12/2003 | Goldstein et al. | |
| 6,829,688 B2 | 12/2004 | Grubbs et al. | |
| 6,847,983 B2 | 1/2005 | Somalwar et al. | |
| 6,880,051 B2 | 4/2005 | Timpanaro-Perrotta | |
| 6,981,177 B2 | 12/2005 | Beattie | |
| 7,310,654 B2 | 12/2007 | McNeil | |
| 7,814,056 B2 | 10/2010 | McGrattan et al. | |
| 8,005,797 B1 | 8/2011 | Chepel et al. | |
| 2004/0143713 A1* | 7/2004 | Niles et al. | 711/162 |
| 2004/0268068 A1 | 12/2004 | Curran et al. | |
| 2006/0075294 A1 | 4/2006 | Ma et al. | |
| 2006/0161802 A1 | 7/2006 | Wang et al. | |
| 2006/0218204 A1 | 9/2006 | Ofer et al. | |
| 2006/0242211 A1 | 10/2006 | Becker et al. | |
| 2007/0174325 A1 | 7/2007 | Mooney et al. | |
| 2008/0005201 A1* | 1/2008 | Ting et al. | 707/204 |
| 2008/0244204 A1 | 10/2008 | Cremelie et al. | |
| 2008/0250085 A1* | 10/2008 | Gray et al. | 707/204 |
| 2008/0263109 A1 | 10/2008 | Patterson | |
| 2010/0005259 A1 | 1/2010 | Prahlad et al. | |
| 2010/0049930 A1 | 2/2010 | Pershin et al. | |
| 2010/0077165 A1 | 3/2010 | Lu et al. | |
| 2010/0122324 A1 | 5/2010 | Welingkar et al. | |
| 2011/0004586 A1 | 1/2011 | Cherryholmes et al. | |
| 2011/0167221 A1* | 7/2011 | Pangal et al. | 711/117 |
| 2012/0017060 A1* | 1/2012 | Kapanipathi et al. | 711/162 |

* cited by examiner

*Primary Examiner* — Stephen Elmore
*Assistant Examiner* — Mark Giardino, Jr.
(74) *Attorney, Agent, or Firm* — Rory D. Rankin; Meyertons, Hood, Kivlin, Kowert & Goetzel, P.C.

(57) ABSTRACT

A system, method, and medium for performing incremental backups of a data set within a deduplication storage system. An incremental backup of a data set is initiated, and the changed data items of the data set are deduplicated. An extents catalog is created to fully describe the data set. References associated with the unchanged data items of the data set are retrieved from the extents catalog and then sent to a deduplication engine. The deduplication engine uses the references to retrieve fingerprints associated with the unchanged data items from a previous reference map. Then, the deduplication engine creates a new reference map for the incremental backup and stores the newly generated and retrieved fingerprints in the new reference map.

17 Claims, 6 Drawing Sheets

| Full Catalog 210 | | | |
|---|---|---|---|
| Image 0 | | | |
| Data Item ID | Record ID | Logical Block Address (LBA) | Size |
| A | 0 | 0 | 10 |
| B | 1 | 10 | 10 |
| C | 2 | 20 | 10 |

FIG. 2a

| Extents Catalog 220 | | | |
|---|---|---|---|
| Image 0 | | | |
| Record ID Range | True Image LBA | Image ID | Record ID in Image |
| 0-2 | 0 | 0 | 0-2 |

FIG. 2b

| First Delta Catalog 230 | | | |
|---|---|---|---|
| Image 1 | | | |
| Data Item ID | Record ID | LBA | Size |
| A | 0 | 0 | 20 |

FIG. 2c

| Extents Catalog 240 | | | |
|---|---|---|---|
| Image 1 | | | |
| Record ID Range | True Image LBA | Image ID | Record ID in Image |
| 0-0 | 0 | 1 | 0-0 |
| 1-2 | 20 | 0 | 1-2 |

FIG. 2d

| Second Delta Catalog 250 | | | |
|---|---|---|---|
| Image 2 | | | |
| Data Item ID | Record ID | LBA | Size |
| B | 0 | 0 | 10 |

FIG. 2e

| Extents Catalog 260 | | | |
|---|---|---|---|
| Image 2 | | | |
| Record ID Range | True Image LBA | Image ID | Record ID in Image |
| 0-0 | 0 | 1 | 0-0 |
| 1-1 | 20 | 2 | 0-0 |
| 2-2 | 30 | 0 | 2-2 |

FIG. 2f

Full Backup 310

| LBA | 0 | 9 | 10 | 19 | 20 | 29 |
|---|---|---|---|---|---|---|
| Data Item | A | | B | | C | |

*FIG. 3a*

First Incremental Backup 320

| LBA | 0 | 19 |
|---|---|---|
| Data Item | A | |

*FIG. 3b*

Second Incremental Backup 330

| LBA | 0 | 9 |
|---|---|---|
| Data Item | B | |

*FIG. 3c*

METHOD AND SYSTEM OF PRODUCING A FULL BACKUP IMAGE USING AN INCREMENTAL BACKUP METHOD

BACKGROUND OF THE INVENTION

1. Field of the Invention

The present invention relates generally to backing up a data set, and in particular to a method and system for performing incremental backups of a data set to facilitate efficient restoration of data.

2. Description of the Related Art

Companies and organizations are coping with managing and storing growing amounts of data. As the amount of data generated and stored within organizations escalates, the time and space needed to backup all of the company's data also increases. Consequently, organizations are looking for methods of performing backups that can take less time and use up less storage space. One of the methods of performing backups more efficiently is the use of incremental backups.

A typical backup process will start with a full backup of the data. After the full backup, the company can perform incremental backups to reduce the amount of data being stored and the backup processing time. An incremental backup involves storing only the data that is new or has changed in a data set since the last full or incremental backup. Many incremental backups can be performed in succession between full backups. Using incremental backups can reduce the amount of data that is stored, but it may complicate the restoration process.

Another method of performing backups more efficiently is to employ a deduplication process to reduce the storage of duplicate data. The process of data deduplication is often utilized in backup storage applications. Backup applications generally benefit the most from deduplication due to the requirement for recurrent backups of an existing file system. Typically, most of the files within the file system will not change between consecutive backups, and therefore do not need to be stored.

While creating incremental backups in a deduplication based storage system may decrease storage utilization, it may also add to the complexity and inefficiencies of performing restoration operations. Incremental backups do not contain all of the data items that exist within a data set, and so restoring data following an incremental backup may involve processing multiple incremental backups. This is true whether or not the stored data is deduplicated. Restoration operations tend to be most efficient when performed following a full backup, when all of the data items from a data set are backed up in a single process to a single image, and which are identified in a single catalog. What is needed in the art is a system for performing incremental backups in a deduplication system with minimal data movement while also enabling fast restore operations as if restoring from a full backup.

In view of the above, improved methods and mechanisms for performing incremental backups to allow efficient restoration operations are desired.

SUMMARY OF THE INVENTION

Various embodiments of methods and mechanisms for performing incremental backups of a data set are contemplated.

In one embodiment, an incremental backup of a data set comprised of a plurality of data items is initiated, and then the new or changed data items may be sent from a client to a backup application running on a media server. The backup application may receive the new or changed data items, and then convey the data items to a deduplication engine. The backup application may also generate an extents catalog which fully describes the data set. The backup application may retrieve references associated with the unchanged data items from the extents catalog and then send the references to the deduplication engine.

After the deduplication engine receives the new or changed data items, the deduplication engine may generate fingerprints and deduplicate the data items. The deduplication engine may create a reference map and store the newly generated fingerprints in the reference map. The deduplication engine may also receive references associated with the unchanged data items. The deduplication engine may use the references to locate the fingerprints of the unchanged data items in a previous reference map. The deduplication engine may retrieve the fingerprints from the previous reference map and store the fingerprints associated with the unchanged data items in the current reference map.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 2a illustrates one embodiment of a full catalog of a full backup.

FIG. 2b illustrates one embodiment of an extents catalog of a full backup.

FIG. 2c illustrates one embodiment of a first delta catalog of a first incremental backup.

FIG. 2d illustrates one embodiment of an extents catalog of a first incremental backup.

FIG. 2e illustrates one embodiment of a second delta catalog of a second incremental backup.

FIG. 2f illustrates one embodiment of an extents catalog of a second incremental backup.

FIG. 3a illustrates one embodiment of a full backup of a data set.

FIG. 3b illustrates one embodiment of a first incremental backup of a data set.

FIG. 3c illustrates one embodiment of a second incremental backup of a data set.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein.

Figure 1:
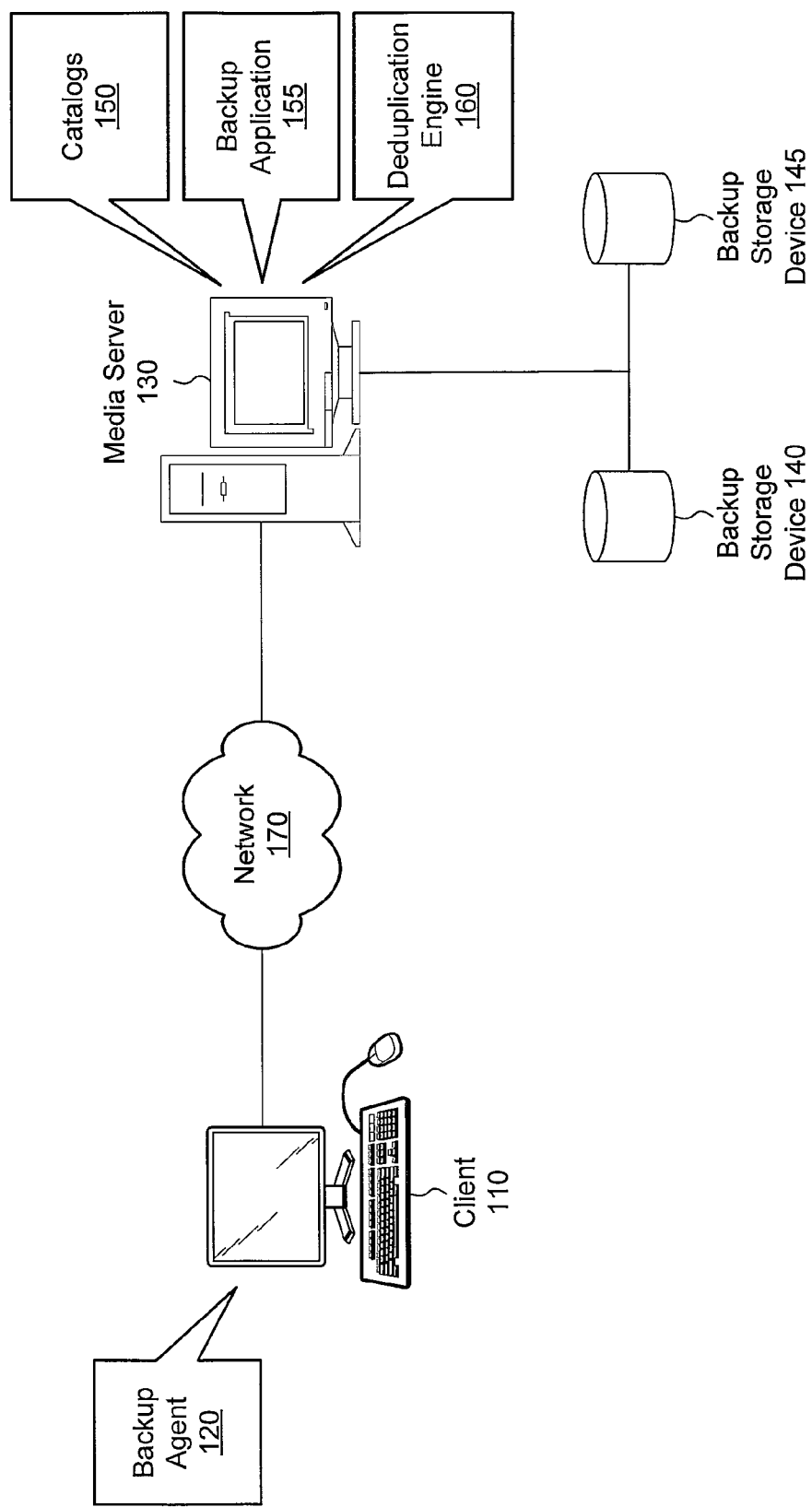
FIG. 1 is a diagram that illustrates a network architecture in accordance with one or more embodiments.

Referring to FIG. 1, a generalized block diagram of one embodiment of a backup storage system architecture is shown. Media server 130 and client 110 are both connected to network 170. Network 170 may comprise a variety of network connections including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. Other network connections and architectures are possible and contemplated.

Media server 130 may be the controller of the backup storage system. In one embodiment, the backup storage system shown in FIG. 1 may be a deduplication based storage system. In another embodiment, the backup storage system may not employ deduplication techniques. Media server 130 may manage backup storage devices 140 and 145, and media server 130 may maintain metadata associated with the backup of a data set received from client 110. Media server 130 may create and store one or more catalogs 150; catalogs 150 may be stored in the physical memory of media server 130. Alternatively, catalogs 150 may be stored on a storage device connected to media server 130, such as backup storage device 140 and/or 145. Catalogs 150 may include catalogs associated with full, incremental, and/or differential backups. Full, delta, and extents catalogs may be created and stored as part of catalogs 150. The size of catalogs 150 may be a function of the number of data items (e.g., files, file segments, objects, images) being backed up and the number of copies of the backup being retained. The number of catalogs 150 may be influenced by the frequency of backups and the retention period used. Also, media server 130 may store catalogs 150 for more than one client. Media server 130 may identify each of the catalogs according to the client with which the catalog is associated, and it may keep the catalogs of different clients separated. Additional metadata may also be stored by media server 130. The metadata may contain information about the data that is stored on the plurality of storage devices managed by media server 130. As illustrated in FIG. 1, media server 130 and backup storage devices 140 and 145 may be referred to as a deduplication storage system.

Media server 130 may host backup application 155, and backup application 155 may perform tasks associated with backing up and restoring data items to client 110. Media server 130 may also host deduplication engine 160. In some embodiments, media server 130 may receive data segments from client 110, and deduplication engine 160 may process the data segments. In other embodiments, deduplication engine 160 may partition data received by media server 130 into data segments and then process the data segments.

Deduplication engine 160 may perform tasks associated with deduplicating data items backed up by client 110. Fingerprints may be used to uniquely identify data items, and fingerprints are typically of much smaller size than data items. Any of a variety of methods (e.g., hash, MD-5, SHA-1) may be used to generate a fingerprint from a data item. Deduplication engine 160 may also create a fingerprint index to store fingerprints associated with all of the data items stored in backup storage devices 140 and 145.

After generating a fingerprint for a new data item, deduplication engine 160 may deduplicate the new data item. As used herein, deduplicating refers to a multi-step process whereby redundant data items are discarded and unique data items are retained. The deduplication process may begin with a search of the fingerprint index for an identical, matching fingerprint to the newly generated fingerprint. If a match is found, then the new data item may be deleted and a pointer to the identical data item already in storage may be put in its place. Also, deduplication engine 160 may keep a reference count for each data item in storage, and it may increment the reference count for a specific data item when that data item is referenced by a new identical data item. If a match is not found after searching the fingerprint index, then the new data item may be stored in backup storage device 140 or 145 and then the fingerprint may be added to the fingerprint index. The deduplication process may be finished after this step.

Deduplication engine 160 may maintain a mapping between fingerprints and the storage location of their corresponding data items to determine where the data item resides after finding a matching fingerprint. This mapping may allow media server 130 to locate the actual location of a data item from a fingerprint generated from the data item. This mapping may also allow a pointer to reference the location of the stored data item when replacing a deleted identical data item.

Media server 130 is representative of any number of media servers which may be connected to network 170. Media server 130 may be configured to store backup data in backup storage devices 140 and 145. Media server 130 may be directly connected to backup storage devices 140 and 145 or connected over any of a variety of networks, such as a LAN, storage area network (SAN), or other network. In one embodiment, backup storage devices 140 and 145 may be adapter cards directly attached to a bus of the media server 130. Media server 130 may use internal memory (e.g., random-access memory (RAM)) for buffering data when receiving and sending data to and from client 110, backup storage devices 140 and 145, or other devices.

Backup storage devices 140 and 145 are representative of any number of backup storage devices, and may comprise any of a variety of types of storage media, such as a hard disk drive, disk volume, optical drive, tape drive, tape volume, robotic tape library, or other storage medium. Backup storage devices 140 and 145 may be further coupled to several varieties of storage devices consisting of one or more hard disks, disk arrays, tape drives, tape libraries, server blades, or specialized devices, and may include a variety of memory devices such as RAM, Flash RAM, MEMS (Micro Electro Mechanical Systems) storage, battery-backed RAM, and/or non-volatile RAM (NVRAM), etc.

Client 110 may be a user computer that communicates with media server 130 to backup a data set or restore one or more data items from a previous backup. In other embodiments, client 110 may be directly connected to a backup storage device (not shown) to which client 110 sends and retrieves backup data. In those embodiments, client 110 may perform many or all of the functions described herein as being performed by media server 130. Client 110 is representative of any number of clients and any number of stationary or mobile computers such as servers, desktop PCs, laptops, handheld computers, smartphones, or other computing devices. Client 110 may host backup agent 120 to assist with backup and restore operations; backup agent 120 may be a software application that runs locally on client 110 and communicates with media server 130 over network 170. Backup agent 120 may assist backup application 155 on media server 130 in performing backups of a data set on client 110. A data set may include data structures and data items such as files, images, directories, databases, volumes, file systems, and others.

Typically, a full backup will have been performed prior to initiating a partial backup. After a full backup has been performed, incremental or differential backups may be performed to reduce the amount of data transferred and stored as compared to a full backup. In one embodiment, backup agent 120 may initiate an incremental backup of the data set of client 110. In another embodiment, backup agent 120 may receive a request from backup application 155 on media server 130 to begin an incremental backup. To perform an incremental backup, backup agent 120 may scan a file system of client 110 and determine what files are contained within the file system. Backup agent 120 may then compare the files on client 110 to a previously created backup. The previous backup may correspond to a full or partial backup. Based upon this comparison, new, deleted, and changed files, and or any other changes, may be identified. After determining which files are new or have changed, backup agent 120 may send the new and changed files, along with a full image description, to media server 130. Backup agent 120 may maintain a change journal to keep track of the changes to the files stored on client 110. It is noted that the terms file or files may be used interchangeably with the terms data item or data items. In other embodiments, backup application 155 may perform some of the tasks described above as being performed by backup agent 120.

After a data set has been backed up, a user on client 110 may wish to restore one or more data items from the backed up data set. In one embodiment, a user interface for selecting items or objects to be restored may be provided. An extents catalog on media server 130 may be used to generate a browsable point-in-time view of the backed up data set. A user may browse the point-in-time view of the data set and select data items to be restored. Once a data item has been identified, backup agent 120 may query media server 130 for the requested data item. Media server 130 may detect the request to restore the requested data item, and then media server 130 may use an extents catalog to identify which specific backup contains the requested data item. Media server 130 may also use a deduplication reference map to locate and retrieve one or more fingerprints corresponding to the requested data item. Media server 130 may only need to reference one extents catalog and one reference map as part of the restore operation, regardless of how many incremental backups have been performed since the last full backup. The ability to restore data from a single catalog and one reference map may allow for an efficient restoration of data items to client 110. After retrieving the fingerprints from the reference map, media server 130 may then use the fingerprints to locate and retrieve the requested data item from backup storage devices 140 and/or 145 and return the requested data item to the user.

The media server and client of FIG. 1 may comprise various hardware and software components. The hardware components may include one or more processors, memory devices, and input/output (I/O) devices, connected together via a bus architecture. The software components may include an operating system stored in a memory device. The operating system may be any of various types of operating systems, such as Microsoft Windows®, Linux®, Solaris®, or others. The operating system may be operable to provide various services to the user and may support the execution of various programs such as backup applications, server applications, software agents, or any of a variety of other applications.

In other embodiments, the number and type of clients, servers, networks, and backup storage devices is not limited to those shown in FIG. 1. Any number and combination of servers, desktops, laptops, and mobile clients may be interconnected in network architectures via various combinations of modem banks, direct LAN connections, wireless connections, WAN links, etc. Also, at various times one or more clients and servers may operate offline. In addition, during operation, individual client and server connection types may change as mobile users travel from place to place connecting, disconnecting, and reconnecting to network 170.

Referring now to FIG. 2a, one embodiment of a full catalog for storing information about a plurality of data items of a data set backed up in a full backup operation is shown. Full catalog 210 is representative of a catalog of metadata that may be created as part of a full backup of a data set; the full backup may also be identified as image 0. In one embodiment, full catalog 210 may be created by a media server to track the data items of the data set backed up and stored in a backup storage device. Full catalog 210 may be stored in the physical memory of the media server or in a storage device connected to the media server. In the example shown in FIG. 2a, the data set has three data items, and full catalog 210 contains three entries for these three data items. The example shown in FIG. 2a is for illustrative purposes only; other data sets may have substantially more than three data items. Also, a data set may be representative of an image, a snapshot, a set of files, or other grouping of data backed up by a client.

Full catalog 210 may contain information for each entry identifying the data item identification (ID), record ID, the logical block address (LBA), and the size in number of blocks. The LBA and size for each data item may be the location where the data item exists within the backup image. In FIG. 2a, there are three data items with ID's A, B, and C. Data item ID's A, B, and C correspond to record ID's 0, 1, and 2, respectively. The LBA's are listed in full catalog 210 for each of data items A-C, and each of data items A-C has a size of 10 blocks. In other embodiments, full catalog 210 may comprise additional information and/or may be organized in a different configuration or architecture than that shown in FIG. 2a.

In FIG. 2b, extents catalog 220 is shown, and extents catalog 220 may be created and stored by a media server as part of a full or partial backup. As used herein, a partial backup may refer to an incremental or differential backup. Extents catalog 220 contains one entry for record ID range 0-2. This entry references record ID's 0-2 within image ID 0. The entry also corresponds to true image LBA 0. True image LBA may refer to the location of the record within the client's data set. When a client backs up a data set, the client may receive an image ID or handle from a media server as part of the backup operation. The backup may henceforth be referenced by that image ID. For example, the client and media server may refer to a previous backup by the image ID when referencing unchanged data items from previous backups. Also, the media server may refer to a backup by the image ID when the media server performs restoration operations. In other embodiments, extents catalog 220 may comprise additional information and/or may be organized in a different configuration or architecture than that shown in FIG. 2b.

In FIG. 2c, first delta catalog 230 is shown, and first delta catalog 230 may be created and stored by a media server as part of a first incremental backup. The first incremental backup may also be referred to as image 1; first delta catalog 230 may also be associated with image 1. As illustrated in FIG. 2c, one data item has changed since the previous backup; the previous backup in this case is the full backup corresponding to full catalog 210. Data item ID A (Record ID 0 in image 1) has changed since the full backup, and so there is an entry in first delta catalog 230 for data item ID A. The size of data item ID A has changed from the previous backup, and the size is now 20 blocks, starting at LBA 0 of image 1. In other embodiments, data items that have been deleted may contain an entry in first delta catalog 230. Entries for deleted items may not contain data for the LBA and size fields as these fields would not apply to a deleted item.

In FIG. 2d, extents catalog 240 is shown, and extents catalog 240 may be created as part of the first incremental backup associated with first delta catalog 230. Extents catalog 240 contains 2 entries: one entry is for record ID range 0-0, and the second entry is for record ID range 1-2. Record ID 0, corresponding to true image LBA 0, references record ID 0 within image ID 1. Record ID's 1-2, corresponding to true image LBA 20, reference record ID's 1-2 within image ID 0. When the client performs the first incremental backup, it may send only data item ID A to the media server. A backup application on the media server may send information obtained from extents catalog 240 to the deduplication engine, so that the deduplication engine can reference the correct prior images for the unchanged data items. The backup application may send true image LBA's, Image ID's, and record ID's in the images for the changed and unchanged data items to the deduplication engine.

In FIG. 2e, second delta catalog 250 is shown, and second delta catalog 250 may be created and stored by a media server as part of a second incremental backup. The second incremental backup may also be referred to as image 2; second delta catalog 250 may also be associated with image 2. As illustrated in FIG. 2e, one data item has changed since the previous backup; the previous backup in this case is the first incremental backup (image 1) corresponding to first delta catalog 230. Data item ID B (Record ID 0 in Image 2) has changed since the first incremental backup, and so there is an entry in first delta catalog 250 for data item ID B. The LBA of 0 and size of 10 blocks for data item ID B indicates the location of data item ID B within Image 2.

In FIG. 2f, extents catalog 260 is shown, and extents catalog 260 may be created as part of the second incremental backup associated with second delta catalog 250. Extents catalog 260 contains 3 entries: one entry is for record ID range 0-0, the second entry is for record ID range 1-1, and the third entry is for record ID range 2-2. Record ID 0, corresponding to true image LBA 0, references record ID 0 within image ID 1. Record ID 1, corresponding to true image LBA 20, references record ID 0 within image ID 2. Record ID 2, corresponding to true image LBA 30, references record ID 2 within image ID 0. When the client performs the second incremental backup, the client may send only data item ID B to the media server. A backup application on the media server may send information obtained from extents catalog 260 to the deduplication engine, so that the deduplication engine can reference the correct prior images for the unchanged data items. In various embodiments, the backup application may send image LBA's, image ID's, and record ID's in the images for the changed and unchanged data items to the deduplication engine.

Referring now to FIG. 3a, a full backup is shown. Full backup 310 displays the data items sent to a deduplication storage system from a client as part of a full backup operation. Full backup 310 corresponds to full catalog 210 and Image 0, and there are three data items in full backup 310 corresponding to the three entries in full catalog 210. Data item A (LBA's 0-9), data item B (LBA's 10-19), and data item C (LBA's 20-29) are the three data items backed up as part of the full data set backup.

In FIG. 3b, a first incremental backup is shown. First incremental backup 320 displays the data item sent to the deduplication storage system from the client as part of a first incremental backup. First incremental backup 320 corresponds to first delta catalog 230 and Image 1, and there is one data item in first incremental backup 320 corresponding to the one entry in first delta catalog 230. Data item A (LBA's 0-19) is sent to the deduplication storage system from the client as part of the first incremental backup.

In FIG. 3c, a second incremental backup is shown. Second incremental backup 330 displays the data item sent to the deduplication storage system from the client as part of a second incremental backup. Second incremental backup 330 corresponds to second delta catalog 250 and Image 2, and there is one data item in second incremental backup 330 corresponding to the one entry in second delta catalog 250. Data item B (LBA's 0-9) is sent to the deduplication storage system from the client as part of the second incremental backup.

Figure 4:
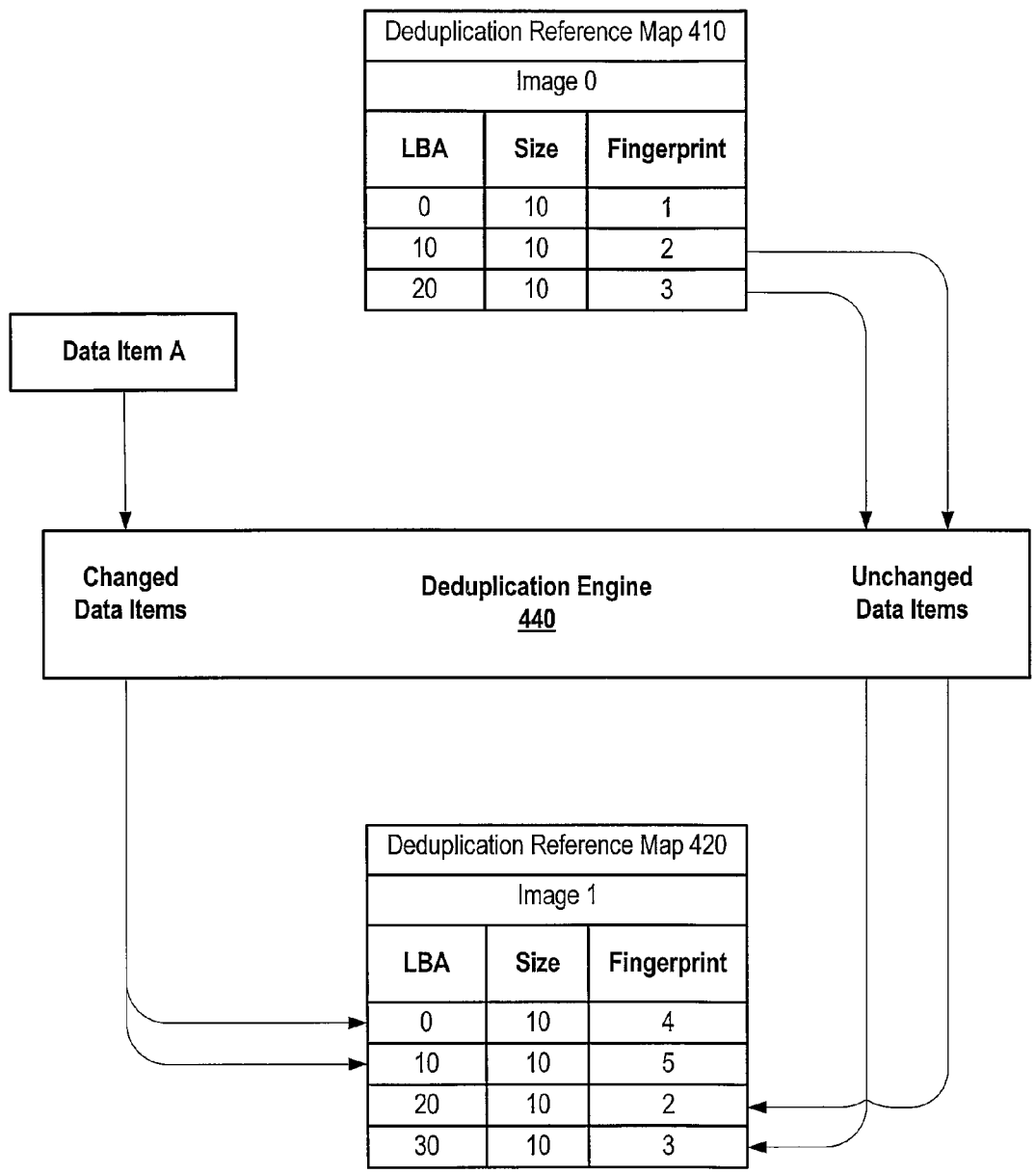
FIG. 4 illustrates one embodiment of the creation of a reference map as part of a first incremental backup operation.

Referring now to FIG. 4, one embodiment of the creation of a reference map as part of a first incremental backup operation is shown. Deduplication reference map 420 may be created as part of the first incremental backup operation, and deduplication reference map 420 (corresponding to image 1) is shown at the bottom of FIG. 4. Deduplication reference map 410 is also shown in FIG. 4, and deduplication reference map 410 corresponds to image 0; image 0 corresponds to the full backup of the client data set. In the example shown, an image number of 0 is assigned to the image associated with the full backup (though any suitable identifier may be used). The deduplication storage system may create deduplication reference map 410 as part of a full backup operation; the full backup operation may be performed before the first incremental backup operation.

During a backup operation, deduplication engine 440 may receive data items from a backup application, and each data item may have an associated LBA and size. In various embodiments, the backup application may send the LBA and size as part of the backup operation, and these values may be stored in (or in association with) deduplication reference map 410. Deduplication engine 440 may create fingerprints for the received data items, and the fingerprints may be stored in a table or map such as reference map 410. Alternatively, ID's of the fingerprints may be stored in deduplication reference map 410.

In the example illustrated in FIG. 4, units of data and the sizes of entries are ten blocks. A fingerprint may be created and stored in deduplication reference map 410 for each ten blocks (i.e., fingerprint 1 for LBA 0, fingerprint 2 for LBA 10, fingerprint 3 for LBA 20). In other embodiments, the units of data from which a fingerprint is generated may be any suitable size and may vary in size during a single backup operation. In addition to maintaining deduplication reference map 410, deduplication engine 440 may also maintain a separate mapping of fingerprints to the actual storage location of the corresponding data item. In some embodiments, this mapping may be stored in deduplication reference map 410. In other embodiments, deduplication reference map 410 may be organized differently, such as with additional information stored in the map.

As part of the first incremental backup operation, deduplication engine 440 may receive data item A from the backup application. In the example illustrated in FIG. 4, fingerprints 4 and 5 are generated by deduplication engine 440 from data item A. Fingerprint 4 is stored in the entry for LBA 0 of deduplication reference map 420. Fingerprint 5 is stored in the entry for LBA 10 of deduplication reference map 420. Deduplication engine 440 may receive references to the unchanged data items from the backup application, and the references may identify previous images for the unchanged data items. Deduplication engine 440 may use the references to locate metadata corresponding to the unchanged data items in the previous reference map. Metadata associated with the unchanged data items may be copied from the previous reference map (i.e., deduplication reference map 410). As shown in FIG. 4, fingerprints 2 and 3 for LBA's 10 and 20 of deduplication reference map 410 may be copied to deduplication reference map 420. Fingerprint 2 may be stored with the entry for LBA 20, and fingerprint 3 may be stored with the entry for LBA 30. In other embodiments, references or pointers to fingerprints 2 and 3 of deduplication reference map 410 may be stored in deduplication reference map 420.

It is noted that while an incremental backup was performed, and only changed data (and an identification of changes) was sent as part of the incremental backup procedure, map 420 represents all of the client data in a manner similar to that of a full backup—including fingerprint data for unchanged data. Consequently, not only was the unchanged data not sent from the backup application, but it was not necessary to generate fingerprints for the unchanged data, which are shown to be included in map 420.

In some embodiments, the backup application may calculate offsets between a prior backup and the current backup for the LBA's associated with the unchanged data items. These offsets may be sent to deduplication engine 440, and deduplication engine 440 may use these offsets to locate the proper metadata associated with the unchanged data items in a previous reference map. The offsets may map the LBA's of the current reference map to the previous reference map.

Deduplication engine 440 may use deduplication reference map 420 to locate fingerprints of a specific LBA during a restoration operation to restore one or more data items to the client. The client (or restore application) may specify a particular LBA and a size when requesting a restore operation. Deduplication reference map 420 may represent an image of the full data set backed up by the client.

Figure 5:
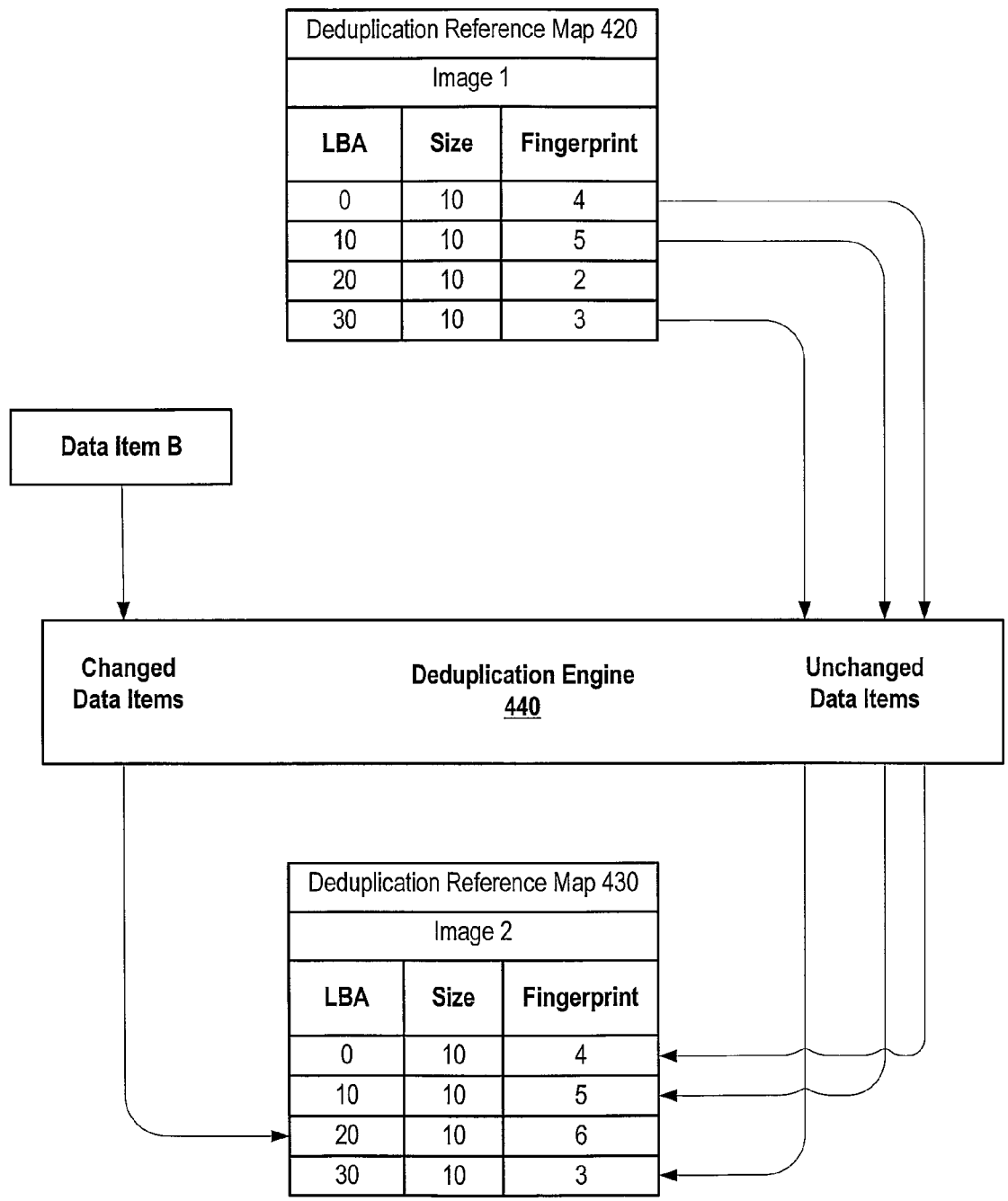
FIG. 5 illustrates one embodiment of the creation of a reference map as part of a second incremental backup operation.

Referring now to FIG. 5, one embodiment of the creation of a reference map as part of a second incremental backup operation is shown. Deduplication reference map 430 may be created as part of the second incremental backup operation, and deduplication reference map 430 (corresponding to image 2) is shown at the bottom of FIG. 5. Deduplication reference map 420 is also shown in FIG. 5, and deduplication reference map 420 corresponds to image 1 and to the first incremental backup of the client data set. Deduplication engine 440 is also shown in FIG. 5, and deduplication engine 440 may receive data item B from a backup application. Deduplication engine 440 may generate a fingerprint from received data item B. In the example illustrated in FIG. 5, fingerprint 6 has been generated and is stored in the entry for LBA 20 of deduplication reference map 430.

Metadata associated with the unchanged data items may be copied to deduplication reference map 430 from the previous reference map (i.e., deduplication reference map 420). As is shown in FIG. 5, fingerprints 4, 5, and 3 for LBA's 0, 10, and 30, respectively, of deduplication reference map 420 may be copied to deduplication reference map 430. Fingerprint 4 may be stored with the entry for LBA 0, fingerprint 5 may be stored with the entry for LBA 10, and fingerprint 3 may be stored with the entry for LBA 30.

Figure 6:
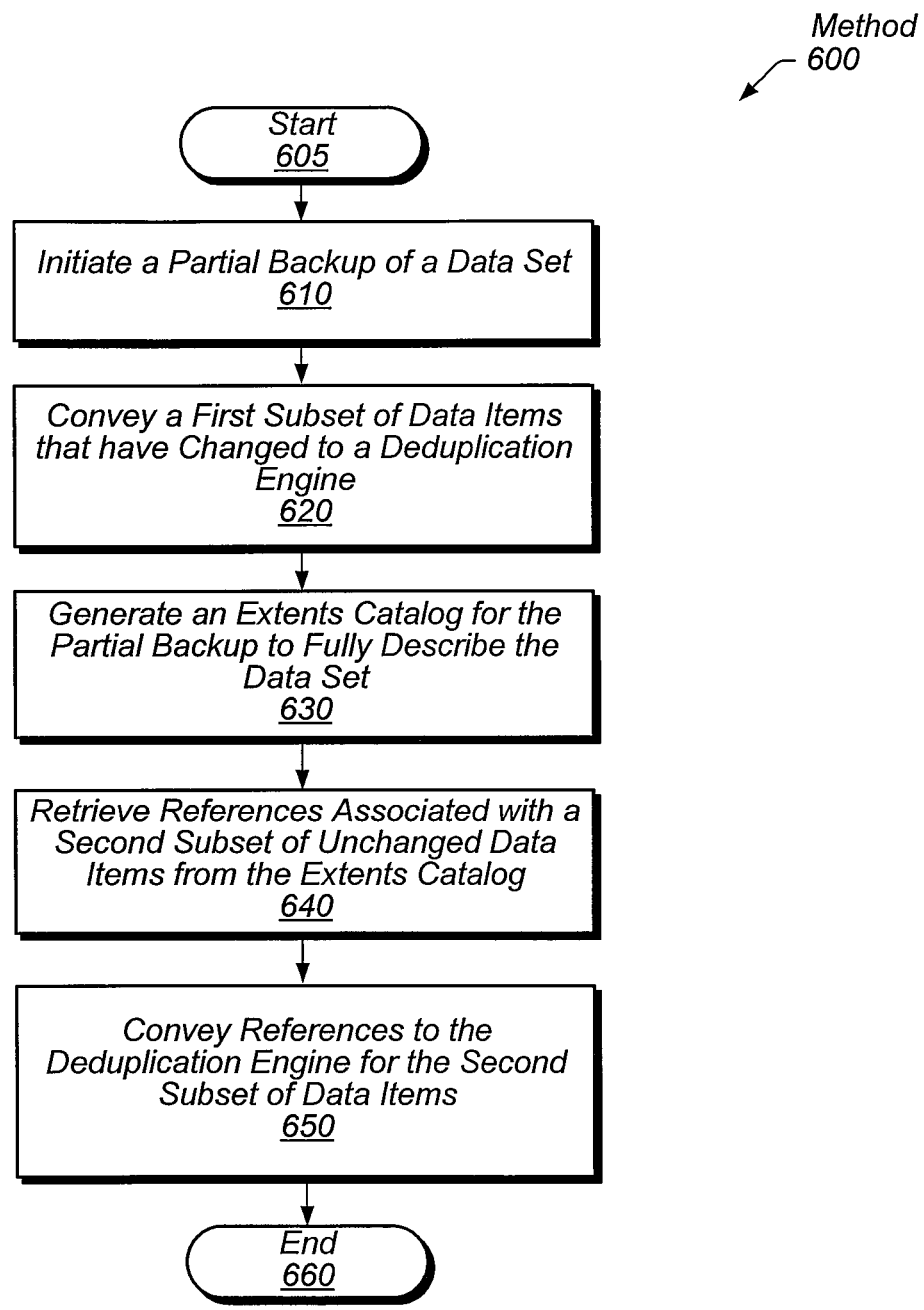
FIG. 6 is a generalized flow diagram illustrating one embodiment of a method to perform a partial backup of a data set.

Referring now to FIG. 6, one embodiment of a method for performing a backup of a data set is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 600 starts in block 605, and then a partial backup of a data set may be initiated in block 610. The partial backup may, for example, be an incremental backup or a differential backup. A client may send new or changed data items to a deduplication storage system. The client may also send metadata such as LBA's and sizes associated with the changed data items to a backup application on a media server. In other embodiments, the client may also send metadata describing the unchanged data items. Such metadata may include LBA's and sizes associated with the unchanged data items to the deduplication storage system.

Next, a first subset of data items that have changed may be conveyed to a deduplication engine (block 620). In one embodiment, the deduplication engine may generate fingerprints after receiving the first subset of data items. Subsequently, the first subset of data items may be deduplicated by the deduplication engine. Next, an extents catalog may be generated for the partial backup to fully describe the data set (block 630). It is noted that in alternative embodiments, the extents catalog (step 630) may be generated prior to directing the client to send changed or new data, or directing the deduplication engine to reference unchanged data. The extents catalog may include LBA's, record ID's, and image ID's for the plurality of data items in the data set. References associated with a second subset of unchanged data items may be retrieved from the extents catalog in block 640. Then, references associated with the second subset of unchanged data items may be conveyed to the deduplication engine (block 650). The references may point to LBA's within previous images for each of the unchanged data items. The deduplication engine may receive the references and as a result, may save time by not having to generate fingerprints for the unchanged data items. In various embodiments, the references corresponding to unchanged data items may be provided by the backup application to the deduplication engine with a command or other indication to copy the references or data items to the new image. In such an embodiment, the deduplication may simply copy the references and associated fingerprints to a new map for the image. As noted above, generation of new fingerprints is not necessary as the data is unchanged. After block 650, the method may end in block 660.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for performing backups of a data set, wherein the data set comprises a plurality of data items, the method comprising:
   initiating a partial backup of the data set, wherein said partial backup includes less than all of the data set;
   wherein as part of said partial backup, the method comprises:
      conveying a first subset of the plurality of data items to a deduplication engine, wherein the first subset comprises data items that are new or have changed since a previous backup of the data set;
      generating an extents catalog for the partial backup which fully describes all of the data set;
      retrieving references associated with a second subset of the plurality of data items from the extents catalog, wherein the second subset comprises data items that are unchanged since a previous backup of the data set; and
      conveying references associated with the second subset of data items to the deduplication engine, wherein said references comprise identifications of one or more previous images corresponding to previous full or partial backups of the data set;
   at the deduplication engine:
      generating fingerprints for the first subset of the plurality of data items;
      creating a reference map and storing the fingerprints in said reference map; and
      receiving references associated with the second subset of data items and storing said references in the reference map.

2. The method as recited in claim 1, wherein the plurality of data items are assigned logical block addresses (LBA's) according to their locations within an image, and wherein said references further comprise LBA's within previous images.

3. The method as recited in claim 2, further comprising:
   detecting a request to restore one or more data items corresponding to the partial backup;
   using the extents catalog to determine corresponding LBA's and previous images for said one or more data items;
   using said LBA's to retrieve said one or more data items from said previous images; and
   sending said one or more data items to a user.

4. The method as recited in claim 1, further comprising:
   using said references to locate fingerprints corresponding to the second subset of data items in a previous reference map; and
   copying fingerprints corresponding to the second subset of data items from a previous reference map to said reference map.

5. The method as recited in claim 1, wherein the partial backup of the data set comprises an incremental backup of the data set.

6. The method as recited in claim 1, wherein the partial backup of the data set comprises a differential backup of the data set.

7. A non-transitory computer readable storage medium comprising program instructions to perform backups of a data set, wherein the data set comprises a plurality of data items, and wherein when executed the program instructions are operable to:
   initiate a partial backup of the data set, wherein said partial backup includes less than all of the data set;
   wherein as part of said partial backup, the program instructions are executable to:
      convey a first subset of the plurality of data items to a deduplication engine, wherein the first subset comprises data items that are new or have changed since a previous backup of the data set;
      generate an extents catalog for the partial backup which fully describes all of the data set;
      retrieve references associated with a second subset of the plurality of data items from the extents catalog, wherein the second subset comprises data items that are unchanged since a previous backup of the data set; and
      convey references associated with the second subset of data items to the deduplication engine, wherein said references comprise identifications of one or more previous images corresponding to previous full or partial backups of the data set;
   at the deduplication engine:
      generate fingerprints for the first subset of the plurality of data items;
      create a reference map and store the fingerprints in said reference map; and
      receive references associated with the second subset of data items and storing said references in the reference map.

8. The non-transitory computer readable storage medium as recited in claim 7, wherein the plurality of data items are assigned logical block addresses (LBA's) according to their locations within an image, and wherein said references further comprise LBA's within previous images.

9. The non-transitory computer readable storage medium as recited in claim 8, wherein when executed the program instructions are further operable to:
   detect a request to restore one or more data items corresponding to the partial backup;
   use the extents catalog to determine corresponding LBA's and previous images for said one or more data items;
   use said LBA's to retrieve said one or more data items from said previous images; and
   send said one or more data items to a user.

10. The non-transitory computer readable storage medium as recited in claim 7, wherein when executed the program instructions are further operable to:

use said references to locate fingerprints corresponding to the second subset of data items in a previous reference map; and copy fingerprints corresponding to the second subset of data items from a previous reference map to said reference map.

11. The non-transitory computer readable storage medium as recited in claim 7, wherein the partial backup of the data set comprises an incremental backup of the data set.

12. The non-transitory computer readable storage medium as recited in claim 7, wherein the partial backup of the data set comprises a differential backup of the data set.

13. A system for performing backups of a data set, wherein the data set comprises a plurality of data items, the system comprising:

a server; and one or more storage devices coupled to the server;

wherein the server is configured to:

initiate a partial backup of the data set, wherein said partial backup includes less than all of the data set;

wherein as part of said partial backup, the system is configured to:

convey a first subset of the plurality of data items to a deduplication engine, wherein the first subset comprises data items that are new or have changed since a previous backup of the data set;

generate an extents catalog for the partial backup which fully describes all of the data set;

retrieve references associated with a second subset of the plurality of data items from the extents catalog, wherein the second subset comprises data items that are unchanged since a previous backup of the data set; and convey references associated with the second subset of data items to the deduplication engine, wherein said references comprise identifications of one or more previous images corresponding to previous full or partial backups of the data set;

wherein the server is further configured to:

generate fingerprints for the first subset of the plurality of data items;

create a reference map and store the fingerprints in said reference map; and receive references associated with the second subset of data items and storing said references in the reference map.

14. The system as recited in claim 13, wherein the plurality of data items are assigned logical block addresses (LBA's) according to their locations within an image, and wherein said references further comprise LBA's within previous images.

15. The system as recited in claim 13, wherein the server is further configured to:

use said references to locate fingerprints corresponding to the second subset of data items in a previous reference map; and copy fingerprints corresponding to the second subset of data items from a previous reference map to said reference map.

16. The system as recited in claim 13, wherein the partial backup of the data set comprises an incremental backup of the data set.

17. The system as recited in claim 13, wherein the partial backup of the data set comprises a differential backup of the data set.

* * * * *